United States Patent
Park

(10) Patent No.: US 8,766,508 B2
(45) Date of Patent: Jul. 1, 2014

(54) ROTOR FOR A MOTOR AND CONNECTING PIN FOR THE ROTOR

(75) Inventor: Sung-Hyuk Park, Yongin-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 6 days.

(21) Appl. No.: 13/401,262

(22) Filed: Feb. 21, 2012

(65) Prior Publication Data
US 2013/0088111 A1 Apr. 11, 2013

(30) Foreign Application Priority Data
Oct. 6, 2011 (KR) .................. 10-2011-0101750

(51) Int. Cl.
*H02K 1/28* (2006.01)

(52) U.S. Cl.
USPC ........ 310/216.079; 310/216.086; 310/156.19; 310/156.59

(58) Field of Classification Search
USPC ............ 310/214, 216.079, 216.081, 216.082, 310/216.086, 216.009, 216.051, 216.058, 310/216.074, 269, 156.12, 156.19, 156.48, 310/156.59
See application file for complete search history.

(56) References Cited

U.S. PATENT DOCUMENTS

| | | | | |
|---|---|---|---|---|
| 887,521 | A * | 5/1908 | Reist | 310/216.088 |
| 5,811,908 | A * | 9/1998 | Iwata et al. | 310/156.53 |
| 5,952,755 | A * | 9/1999 | Lubas | 310/156.19 |
| 6,794,786 | B2 | 9/2004 | Enomoto et al. | |
| 6,847,145 | B2 * | 1/2005 | Van Dine et al. | 310/156.59 |

FOREIGN PATENT DOCUMENTS

| | | |
|---|---|---|
| JP | 2001-218429 A | 8/2001 |
| JP | 2002-199666 A | 7/2002 |
| KR | 2003-0044747 A | 6/2003 |

* cited by examiner

Primary Examiner — Dang Le
(74) Attorney, Agent, or Firm — Sughrue Mion, PLLC

(57) ABSTRACT

A rotor for a motor is provided including: a rotor core including at least one a first coupling portion on an outer circumference thereof, wherein the first coupling portion includes a first coupling groove or a first coupling projection; at least one division core spaced apart from the rotor core and including a second coupling portion on an outer circumference thereof, the second coupling portion including a second coupling groove or a second coupling projection; and a connecting pin including a third coupling portion and a fourth coupling portion, the third coupling portion to be coupled to the first coupling portion and the fourth coupling portion to be coupling to the second coupling portion.

16 Claims, 6 Drawing Sheets

ROTOR FOR A MOTOR AND CONNECTING PIN FOR THE ROTOR

CROSS-REFERENCE TO RELATED APPLICATION

This application claims priority under 35 U.S.C. §119(a) from Korean Patent Application No. 10-2011-0101750, filed on Oct. 6, 2011, in the Korean Intellectual Property Office, the entire disclosure of which is incorporated herein by reference in its entirety.

BACKGROUND

1. Field

Apparatuses consistent with exemplary embodiments relate to a technology to couple a rotor core connected to a shaft of a motor and a division core disposed apart from the rotor core.

2. Description of the Related Art

A motor may be classified as a permanent magnet motor (PMM), an induction motor, or a switched reluctance motor (SRM). A PMM uses a permanent magnet and can be manufactured in small size. In addition, a PMM exhibits high power density and superior efficiency. Thus, PMMs have been widely used for hybrid vehicles and electric automobiles.

One of a variety of TMMs comprises a rotor which consists of a rotor core to be connected to a shaft, a plurality of division cores disposed apart from the rotor core and permanent magnets disposed between adjacent division cores. In these TMMs, there is a chance of one or more of the division cores disengaging from the rotor core while the motor is rotating. Thus, to prevent division cores from separating from the rotor, there should be a structure to fix the division cores.

However, because a more complex or heavier structure to fix the division cores degrades the performance of the motor, the structure should be as simple and light as possible.

SUMMARY

According to an aspect of an exemplary embodiment, a rotor for a motor includes: a rotor core comprising a first coupling portion on an outer circumference thereof, the first coupling portion comprising a first coupling groove or a first coupling projection; at least one division core spaced apart from the outer circumference of the rotor core and comprising a second coupling portion on a side of the division core facing the rotor core, the second coupling portion comprising a second coupling groove or a second coupling projection; and at least one connecting pin comprising a third coupling portion and a fourth coupling portion, the third coupling portion configured to be coupled to the first coupling portion and the fourth coupling portion configured to be coupling to the second coupling portion.

The first coupling portion may comprise the first coupling groove, wherein a width of the first coupling groove at an edge of the rotor core is smaller than a width of the first coupling groove toward a center of the rotor core, and the second coupling portion may comprise the second coupling groove, wherein a width of the second coupling groove at an edge of the division core is smaller than a width of the second coupling groove toward a center of the division core.

The first coupling portion may comprise the first coupling projection, wherein a width of the first coupling projection at an outer edge of the first coupling projection is larger than a width of the first coupling projection toward a center of the rotor core, and the second coupling portion may comprise the second coupling projection, wherein a width of the second coupling projection at an outer edge of the second coupling projection is larger than a width of the second coupling projection toward a center of the division core.

The first coupling portion may comprise the first coupling groove, wherein a width of the first coupling groove gradually increases from an edge of the rotor core toward a center of the rotor core, and the second coupling portion may comprise the second coupling groove, wherein a width of the second coupling groove gradually increases from an edge of the division core toward a center of the division core.

The first coupling unit and the second coupling unit may each extend along a direction parallel to an axis of rotation of the motor, and the third coupling portion and the fourth coupling portion may be slidably coupled to the first coupling portion and the second coupling portion, respectively.

The third coupling portion may include a third coupling projection to be coupled to the first coupling groove or a third coupling groove to be coupled to the first coupling projection.

The fourth coupling portion may include a fourth coupling projection to be coupled to the second coupling groove or a fourth coupling groove to be coupled to the second coupling projection.

The first coupling portion and the second coupling portion may face each other.

The connecting pin may be made of a non-magnetic material and the rotor core and the division core may be made of a magnetic material.

The rotor may further include a pair of permanent magnets disposed between each pair of adjacent division cores.

According to an aspect of another exemplary embodiment, a connecting pin for use in a rotor, includes: a third coupling portion configured to be coupled to a first coupling portion on an outer circumference of a rotor core, the first coupling portion comprising a first coupling groove or a first coupling projection; and a fourth coupling portion configured to be coupled to a second coupling portion on an inner side of a division core, the second coupling portion comprising a second coupling groove or a second coupling projection.

The third coupling portion may include a third coupling projection to be coupled to the first coupling groove or a third coupling groove to be coupled to the first coupling projection.

The fourth coupling portion may include a fourth coupling projection to be coupled to the second coupling groove or a fourth coupling groove to be coupled to the second coupling projection.

The third coupling portion may comprise the third coupling groove where a width of the third coupling groove at an edge of the connecting pin is smaller than a width of the third coupling groove toward a center of the connecting pin.

The third coupling portion may comprise the third coupling projection where a width of the third coupling projection at an outer edge of the third coupling projection is larger than a width of the third coupling projection toward a center of the connecting pin.

The third coupling portion and the fourth coupling portion may each extend along a direction parallel to an axis of rotation of the motor and may be slidably coupled to the first coupling portion and the second coupling portion, respectively.

Other features and aspects may be apparent from the following detailed description, the drawings, and the claims.

Figure 1:
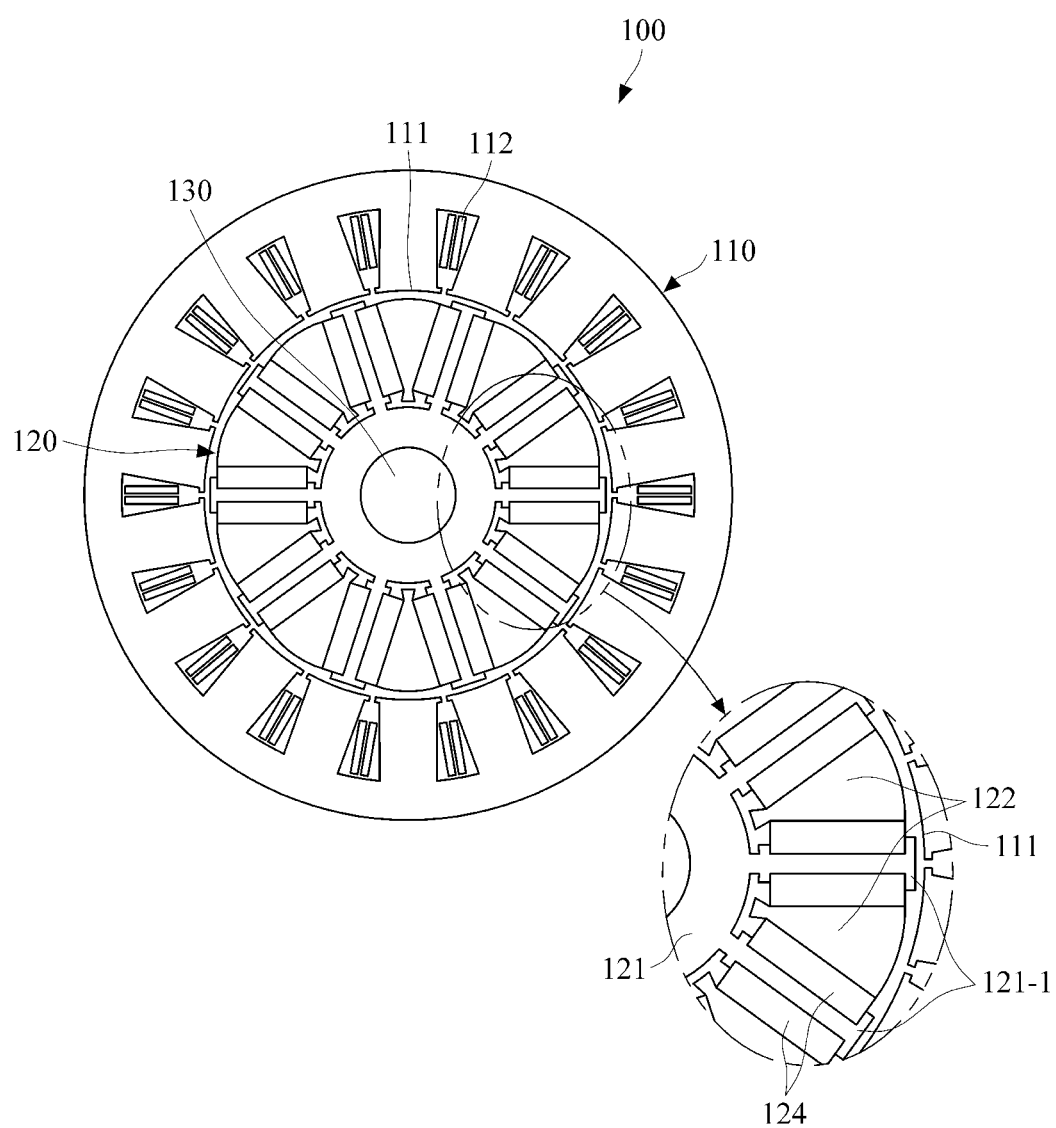
FIG. 1 is a diagram illustrating a cross-sectional view of an exemplary motor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a cross-sectional view of an exemplary motor.

Referring to FIG. 1, motor 100 may include a stator 110, a rotor 120 and a shaft 130.

The stator 110 may include at least one tooth 111 and a core 112 that can be wound around the tooth 111. The stator 110 may be fixedly disposed a predetermined distance apart from the rotor 120. The stator 110 is not be limited to the shape specifically illustrated in FIG. 1.

The rotor 120 may include a rotor core 121, at least one division core 122, a connecting pin 123, and permanent magnets 124.

The rotor core 121 may be connected to the shaft 130. The rotor core 121 rotates along with the rotation of the shaft 130.

The rotor core 121 may include a first coupling portion that can be coupled to the connecting pin 123. The first coupling portion may be formed on an outer circumference of the rotor core 121. The first coupling portion may a first coupling groove or a first coupling projection.

The rotor core 121 may include a stopping portion 121-1. The stopping portion 121-1 may be formed between the pair of permanent magnets 124 disposed between the adjacent division cores 122. The stopping portion 121-1 may be coupled to outer edges of the permanent magnets 124—i.e. The edges of the permanent magnets that are radially outermost from a center of the rotor 120. As a result, the permanent magnets 124 are prevented from separating from the rotor 120.

The rotor core 121 may be made of a magnetic material.

Figure 2:
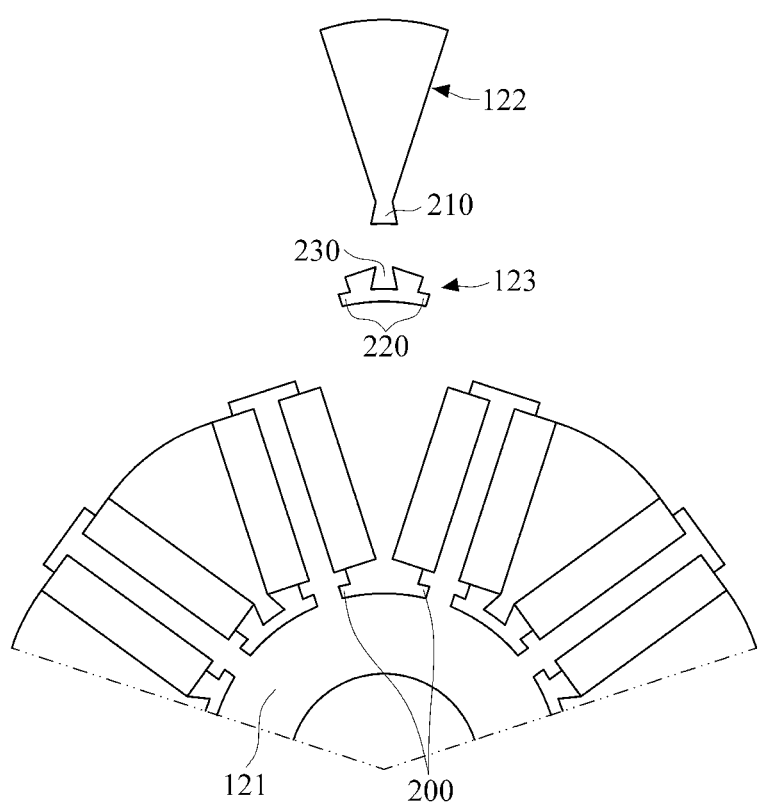
FIG. 2 is a diagram illustrating an exemplary division core and a connecting pin, which are disengaged from a rotor core illustrated in FIG. 1.

FIG. 2 is a diagram illustrating an exemplary division core and a connecting pin, which are disengaged from a rotor core illustrated in FIG. 1.

Referring to FIG. 2, the first coupling portion of the rotor core 121 may be first coupling grooves 200. Alternatively, the first coupling portion may be a first coupling projection.

Referring back to FIG. 1, the division core 122 may be separate from the rotor core 121. For example, a plurality of division cores 122 may be circumferentially disposed around the rotor core 121, and may be radially spaced from the rotor core 121. The division core 122 may be coupled to the connecting pin 123, and may include a second coupling portion.

The second coupling portion may be formed on an inner side of the division core 122—i.e. a side of the division core which is radially closest to the rotor core 121. The second coupling portion may be a second coupling groove or a second coupling projection.

The division core 122 may be made of a magnetic material.

Referring to FIG. 2, the second coupling portion of the division core 122 may be a second coupling projection 210. Alternatively, the second coupling portion may be a second coupling groove.

The first coupling portion of the rotor core 121 may be formed to correspond to the second coupling portion of the division core 122. For example, the first coupling grooves 200 of the rotor core 121 and the second coupling projection 210 of the division core 122 may be formed to face each other.

Referring back to FIG. 1, the connecting pin 123 may include a third coupling portion and a fourth coupling portion, wherein the third coupling portion is to be coupled to the first coupling portion of the rotor core 121 and the fourth coupling portion is to be coupled to the second coupling portion of the division core 122.

For example, as shown in FIG. 2, in a case in which the first coupling portion of the rotor core 121 is the first coupling grooves 200, the third coupling portion may be third coupling projections 220 that can be coupled to the first coupling grooves. As another example, in a case in which the first coupling portion of the rotor core 121 is the first coupling projection, the third coupling unit may be a third coupling groove to be coupled to the first coupling projection.

For example, in a case in which the second coupling portion of the division core 122 is the second coupling groove, the fourth coupling portion may be a fourth coupling projection to be coupled to the second coupling groove. As another example, in a case in which the second coupling portion of the division core 122 is the second coupling projection, the fourth coupling portion may be a fourth coupling groove.

Referring again to FIG. 2, the third coupling portion of the connecting pin 123 may be third coupling projections 220 that can be coupled to the first coupling grooves 200. The fourth coupling portion of the connecting pin 123 may be a fourth coupling groove 230 that can be coupled to the second coupling projection 210.

The connecting pin 123 may be made of a non-magnetic material. Due to the non-magnetic material, the connecting pin 123 can block the magnetic flux flow between the rotor core 121 and the division core 122. Thus, magnetic flux leakage that may pass through the connecting pin 123 can be prevented.

The permanent magnets 124 may be disposed between the division cores 122. For example, a permanent magnet 124 may be located at each side of the division core 122. However, the permanent magnets 124 are not limited to the shapes illustrated in the figures, and may be formed in a variety of forms and disposed between the division cores 122.

In the above examples, the shape of the rotor 120 is only for purposes of example, and it should be appreciated that the shape may vary.

As described above, without any additional complex structure for coupling the rotor core 121 and multiple division cores 122, they can be easily coupled through the connecting pin 123, and thus a simpler rotor assembly process, a reduced number of components, and a smaller and light rotor can be achieved.

Figure 3A:
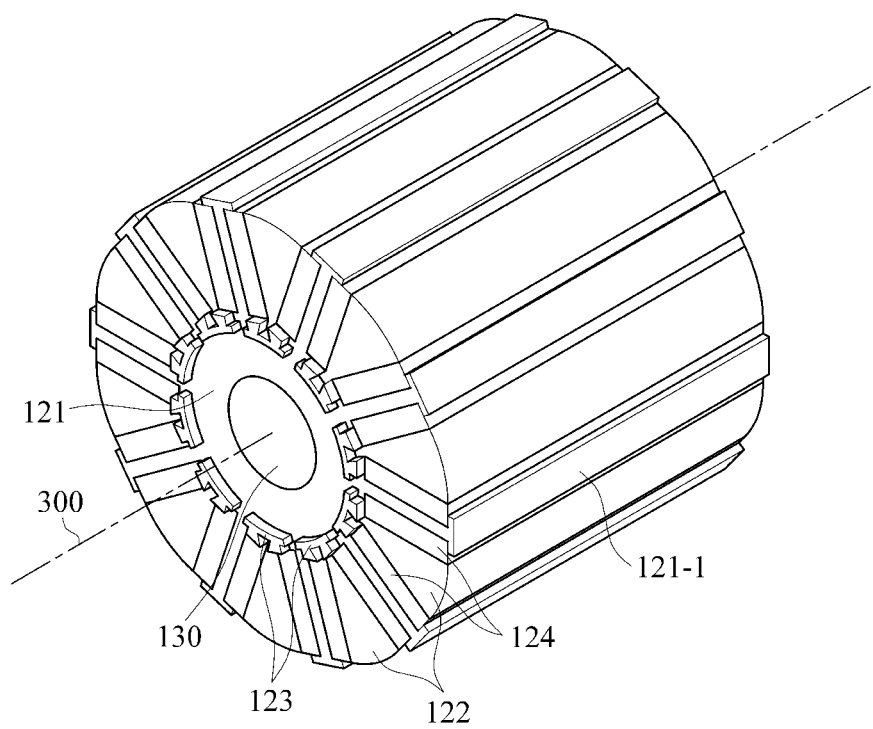
FIGS. 3A and 3B are diagrams illustrating perspective views of an exemplary configuration of a rotor.
Figure 3B:
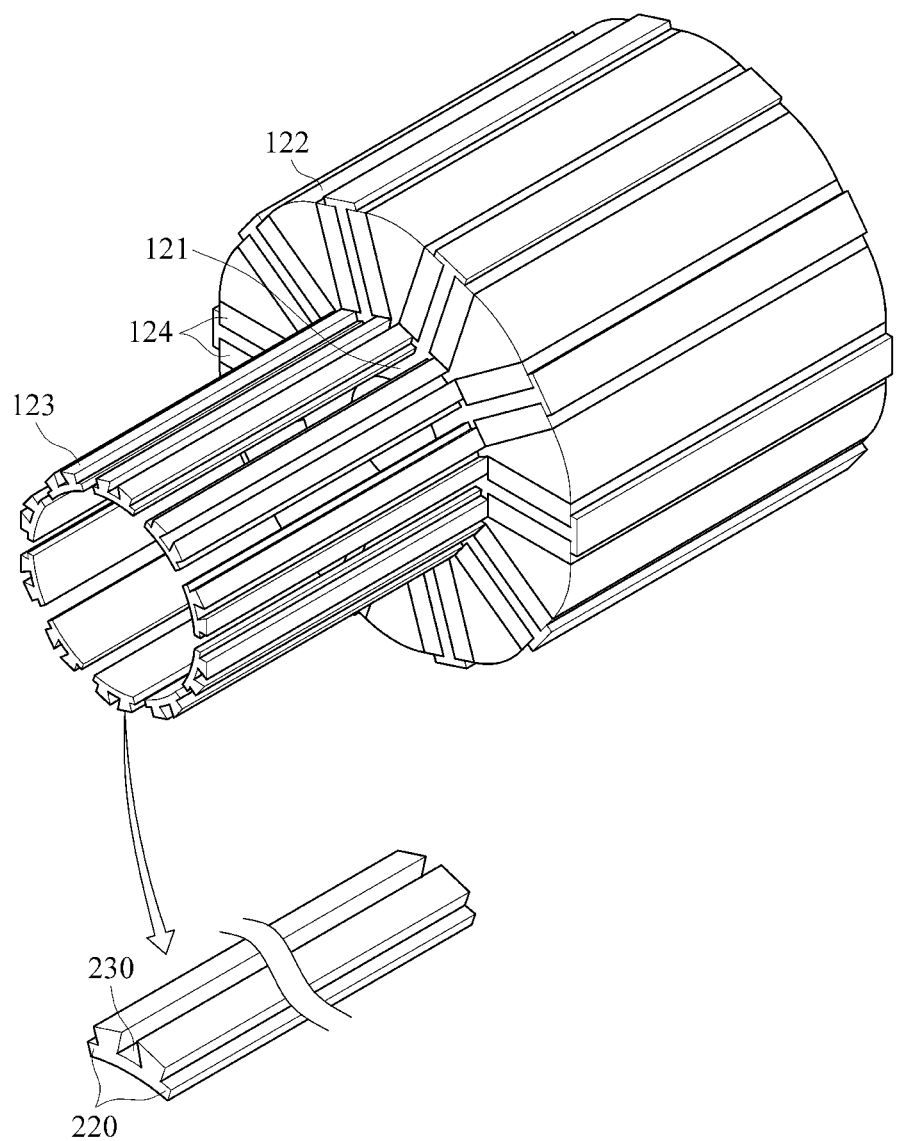

FIGS. 3A and 3B are diagrams illustrating perspective views of an exemplary configuration of a rotor.

Referring to FIGS. 1 and 3A, the rotor 120 may include the rotor core 121, the division cores 122, the connecting pins 123, and the permanent magnets 124.

The rotor core 121 may include the first coupling portions that can be coupled to the connecting pins 123. The first coupling portions may be formed on an outer circumference of the rotor core 121. Each of the first coupling portions may be formed as the first coupling groove or the first coupling projection.

The rotor core 121 may include stopping portions 121-1. A stopping portion 121-1 may be disposed between pairs of adjacent permanent magnets 124 disposed between the adjacent division cores 122. Each stopping portion 121-1 may be coupled to outer surfaces of the permanent magnets 124—i.e. The surfaces radially outermost from the center of the rotor 120. As a result, the permanent magnets 124 are prevented from separating from the rotor 120.

The division cores 122 may be spaced apart from the rotor core 121. Each of the division cores 122 may include the second coupling portion that can be coupled to a connecting pin 123.

Each connecting pin 123 may include the third coupling portion to be coupled to a first coupling portion of the rotor core 121 and the fourth coupling portion to be coupled to a second coupling portion of the division core 122.

The rotor core 121, the division core 122 and the connecting pin 123 may each extend in a direction parallel to an axis of rotation 300 of the motor 100. For example, the first coupling portion formed on the rotor core 121, the second coupling portion formed on the division core 122, and the third and fourth coupling portions formed on the connecting pin 123 may each extend in direction parallel to the axis of rotation 300 of the motor 100.

Referring to FIG. 3B, the connecting pin 123 may include the third coupling projections 220 and the fourth coupling groove 230. The third coupling projections 220 and the fourth coupling groove 230 of the connecting pin 123 may be slidably coupled to the respective first coupling groove 200 and the second coupling projection of the division core 122. For example, the first coupling groove formed on the rotor core 121 and the third coupling projection 220 formed on the connecting pin 123 may be slidably coupled to each other. The fourth coupling groove 230 of the connecting pin 123 and the second coupling projection of the division core 122 may also be slidably coupled to each other. Accordingly, the rotor core 121 and the division core 122 may be easily coupled to each other via the connecting pin 123 without any additional complex coupling structure.

Figure 4:
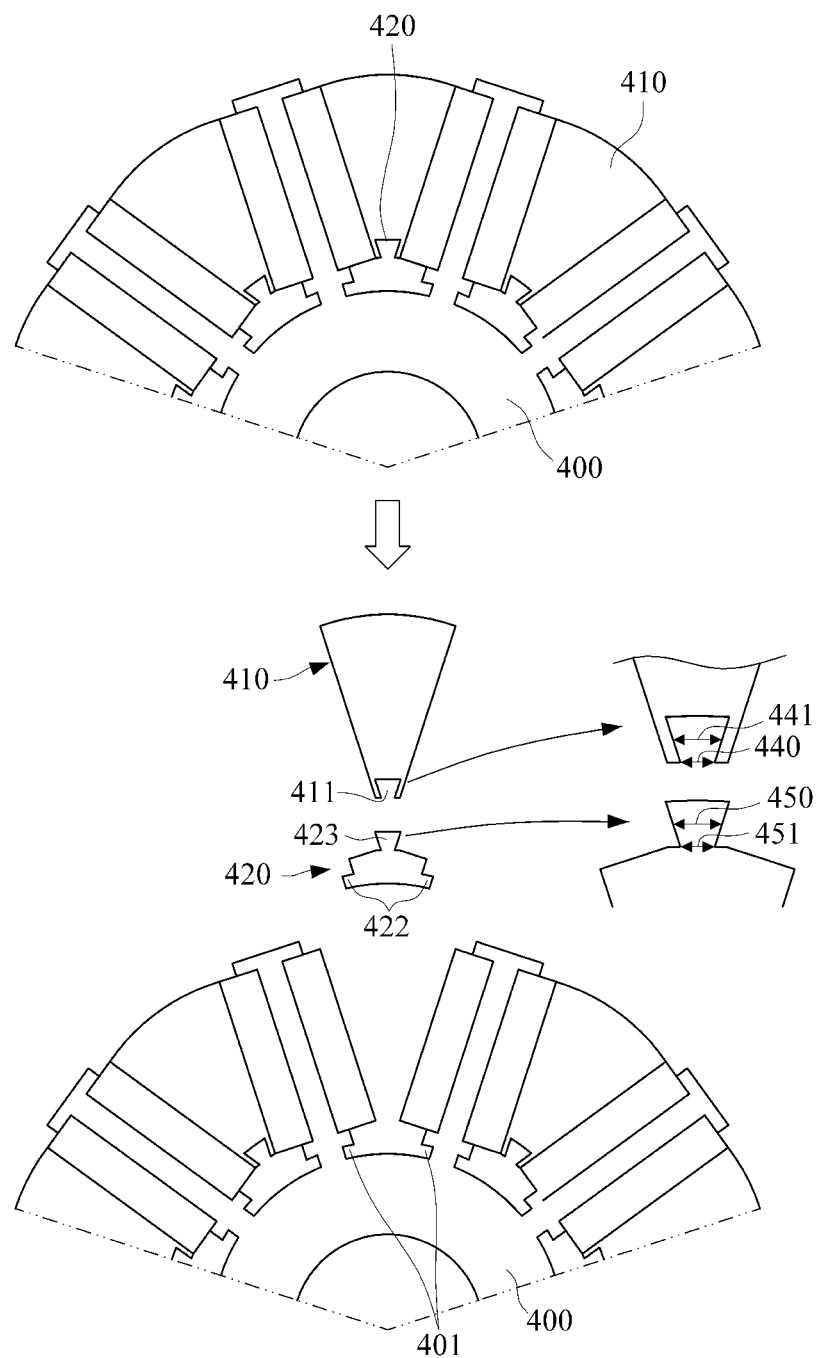
FIG. 4 is a diagram illustrating an exemplary connecting pin.

FIG. 4 is a diagram illustrating an exemplary connecting pin.

Referring to FIG. 4, a rotor may include a rotor core 400, at least one division core 410, and at least one connecting pin 420.

The rotor core 400 may include a first coupling groove 401 that can be coupled to the connecting pin 420. The first coupling groove 401 may be formed on an outer circumference of the rotor core 400.

The division core 410 may be spaced apart from the rotor core 400. The division core may include a second coupling groove 411 that can be coupled to the connecting pin 420.

The connecting pin 420 may include a third coupling projection to be coupled to the first coupling groove 401 of the rotor core 400. The connecting pin 420 may include a fourth coupling projection 423 to be coupled to the second coupling groove 411 of the division core 410.

The second coupling groove 411 may be wider on a side 441 of the groove 411 closer to the center of the division core 410 than on a side 440 of the groove 411 at the edge of the division core 410. For example, the second coupling groove 411 may have a width that increases from the edge of the division core 410 toward the center of the division core 410. The specific shape of the second coupling groove 411 as shown in the figures is merely exemplary, and the second coupling groove 411 may be provided in any of various shapes as long as the width of the groove toward the center side of the division core 410 is greater than the width of the groove at the edge of the division core 410.

The fourth coupling projection 423 may be narrower on a side 451 of the projection 423 close to the center of the connecting pin 420 than on a side 450 of the projection 423 facing the division core 410. For example, the fourth coupling projection 423 may have a width that decreases from a side 450 of the projection 423 facing the division core 410 toward the center of the connecting pin 420. However, the shape of the fourth coupling projection 423 as shown in the figures is merely exemplary, and the fourth coupling projection may be provided in any various shapes as long as the width of the fourth coupling projection is gradually reduced from an outer edge facing the division core 410 toward the center of the connecting pin 420.

Figure 5:
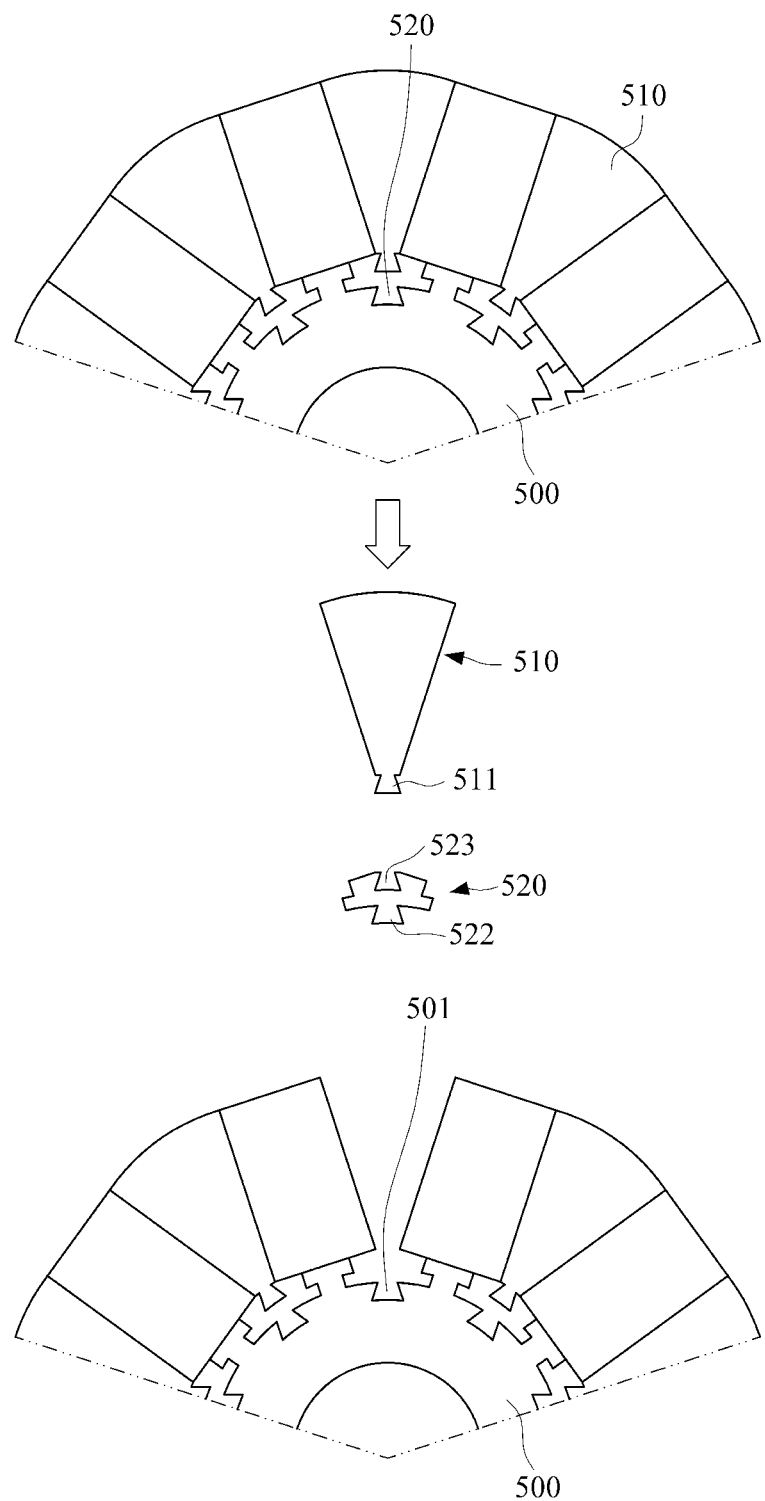
FIG. 5 is a diagram illustrating another exemplary connecting pin.

FIG. 5 is a diagram illustrating another exemplary connecting pin.

Referring to FIG. 5, rotor includes a rotor core 500, at least one division core 510, and at least one connecting pin 520.

The rotor core 500 may include a first coupling groove 501 that can be coupled to the connecting pin 520. The first coupling groove 501 may be formed on an outer circumference of the rotor core 500.

The division core 510 may be spaced apart from the rotor core 500. The division core 510 may include a second coupling projection 511 that can be coupled to the connecting pin 520.

The connecting pin 520 may include a third coupling projection 522 that can be coupled to the first coupling groove 501. The connecting pin 520 may include a fourth coupling groove 523 that can be coupled to the second coupling projection 511.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rotor for a motor, the rotor comprising:
   a rotor core comprising at least one first coupling portion on an outer circumference thereof, wherein the first coupling portion comprises a first coupling groove or a first coupling projection;
   at least one division core spaced apart from the outer circumference of the rotor core, the at least one division core comprising a second coupling portion on a side of the division core facing the rotor core, the second coupling portion comprising a second coupling groove or a second coupling projection;
   at least one connecting pin comprising a third coupling portion, configured to be coupled to the first coupling portion, and a fourth coupling portion, configured to be coupled to the second coupling portion; and
   a pair of permanent magnets disposed between each pair of adjacent division cores, wherein the fourth coupling portion is configured to be coupled to the second coupling portion though a sliding dovetail joint.

2. The rotor of claim 1, wherein the first coupling portion comprises the first coupling groove, wherein a width of the first coupling groove at an edge of the rotor core is smaller than a width of the first coupling groove toward a center of the rotor core, and the second coupling portion comprises the second coupling groove, wherein a width of the second coupling groove at an edge of the division core is smaller than a width of the second coupling groove toward a center of the division core.

3. The rotor of claim 1, wherein the first coupling portion comprises the first coupling projection, wherein a width of the first coupling projection at an outer edge of the first coupling projection is larger than a width of the first coupling projection toward a center of the rotor core, and the second coupling portion comprises the second coupling projection, wherein a width of the second coupling projection at an outer edge of the second coupling projection is larger than a width of the second coupling projection toward a center of the division core.

4. The rotor of claim 1, wherein the first coupling portion comprises the first coupling groove, wherein a width of the first coupling groove gradually increases from an edge of the rotor core toward a center of the rotor core, and the second coupling portion comprises the second coupling groove, wherein a width of the second coupling groove gradually increases from an edge of the division core toward a center of the division core.

5. The rotor of claim 1, wherein the first coupling unit and the second coupling unit each extend along a direction parallel to an axis of rotation of the motor, and the third coupling portion and the fourth coupling portion are slidably coupled to the first coupling portion and the second coupling portion, respectively.

6. The rotor of claim 1, wherein the third coupling portion comprises a third coupling projection to be coupled to the first coupling groove or a third coupling groove to be coupled to the first coupling projection.

7. The rotor of claim 1, wherein the fourth coupling portion comprises a fourth coupling projection to be coupled to the second coupling groove or a fourth coupling groove to be coupled to the second coupling projection.

8. The rotor of claim 1, wherein the first coupling portion and the second coupling portion face each other.

9. The rotor of claim 1, wherein the connecting pin is made of a non-magnetic material, and each of the rotor core and the division core is made of a magnetic material.

10. A connecting pin for use in a rotor, comprising:
a third coupling portion configured to be coupled to a first coupling portion on an outer circumference of a rotor core, the first coupling portion comprising a first coupling groove or a first coupling projection; and
a fourth coupling portion configured to be coupled to a second coupling portion on an inner side of a division core, the second coupling portion comprising a second coupling groove or a second coupling projection,
wherein the connecting pin is made of a non-magnetic material, and
wherein the fourth coupling portion is configured to be coupled to the second coupling portion though a sliding dovetail joint.

11. The connecting pin of claim 10, wherein the third coupling portion comprises a third coupling projection to be coupled to the first coupling groove or a third coupling groove to be coupled to the first coupling projection.

12. The connecting pin of claim 11, wherein the third coupling portion comprises the third coupling groove and a width of the third coupling groove at an edge of the connecting pin is smaller than a width of the third coupling groove toward a center of the connecting pin.

13. The connecting pin of claim 11, wherein the third coupling portion comprises the third coupling projection and a width of the third coupling projection at an outer edge of the third coupling projection is larger than a width of the third coupling projection toward a center of the coupling pin.

14. The connecting pin of claim 10, wherein the fourth coupling portion comprises a fourth coupling projection to be coupled to the second coupling groove or a fourth coupling groove to be coupled to the second coupling projection.

15. The connecting pin of claim 10, wherein the third coupling portion and the fourth coupling portion each extend along a direction parallel to an axis of rotation of the motor and are slidably coupled to the first coupling portion and the second coupling portion, respectively.

16. A rotor for a motor, the rotor comprising:
a rotor core comprising at least one first coupling portion on an outer circumference thereof, wherein the first coupling portion comprises a first coupling groove or a first coupling projection;
at least one division core spaced apart from the outer circumference of the rotor core, the at least one division core comprising a second coupling portion on a side of the division core facing the rotor core, the second coupling portion comprising a second coupling groove or a second coupling projection;
at least one connecting pin comprising a third coupling portion, configured to be coupled to the first coupling portion, and a fourth coupling portion, configured to be coupled to the second coupling portion; and
a pair of permanent magnets disposed between each pair of adjacent division cores,
wherein the rotor core further comprises stopping portions disposed between each pair of permanent magnets, configured to be coupled outer surfaces of each pair of permanent magnets radially outermost from the center the rotor core, and
wherein the fourth coupling portion is configured to be coupled to the second coupling portion though a sliding dovetail joint.

* * * * *